(12) United States Patent
Lakhdhar et al.

(10) Patent No.: US 10,321,376 B2
(45) Date of Patent: Jun. 11, 2019

(54) DETERMINING HANDOVER PARAMETERS

(71) Applicant: BlackBerry Limited, Waterloo (CA)

(72) Inventors: Khaled Lakhdhar, Atlanta, GA (US); Lizhong Zhu, Waterloo (CA); Cristian Lambiri, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 15/270,807

(22) Filed: Sep. 20, 2016

(65) Prior Publication Data

US 2018/0084470 A1    Mar. 22, 2018

(51) Int. Cl.
| | |
|---|---|
| *H04W 4/00* | (2018.01) |
| *H04W 36/20* | (2009.01) |
| *H04W 24/08* | (2009.01) |
| *H04W 36/08* | (2009.01) |
| *H04W 36/30* | (2009.01) |
| *H04B 17/391* | (2015.01) |
| *H04W 36/00* | (2009.01) |

(Continued)

(52) U.S. Cl.
CPC .......... *H04W 36/20* (2013.01); *H04B 17/391* (2015.01); *H04W 24/08* (2013.01); *H04W 36/00837* (2018.08); *H04W 36/08* (2013.01); *H04W 36/30* (2013.01); *H04B 17/318* (2015.01); *H04W 84/12* (2013.01); *H04W 88/06* (2013.01)

(58) Field of Classification Search
CPC ..... H04W 36/20; H04W 24/08; H04W 36/08; H04W 36/30; H04W 84/12; H04B 17/318
See application file for complete search history.

(56) References Cited

U.S. PATENT DOCUMENTS

| | | |
|---|---|---|
| 8,873,508 B1 | 10/2014 | Oroskar |
| 9,538,436 B2 | 1/2017 | Zhu |

(Continued)

FOREIGN PATENT DOCUMENTS

| | | | |
|---|---|---|---|
| WO | 2005096657 | 10/2005 | |
| WO | WO 2014/121457 | * 8/2014 | ............ H04W 36/30 |

OTHER PUBLICATIONS

Canadian Intellectual Property Office, International Search Report for PCT/CA2017/051100 dated Dec. 13, 2017 (6 pages).

(Continued)

*Primary Examiner* — Stephen M D Agosta
(74) *Attorney, Agent, or Firm* — Trop, Pruner & Hu, P.C.

(57) ABSTRACT

In some examples, to mitigate interference of wireless communications, an electronic device that includes a first type wireless component and a second type wireless component receives values of parameters relating to wireless communication using the first type wireless component. The electronic device determines, using a model of a relationship between the parameters relating to wireless communication using the first type wireless component and at least one handover parameter relating to wireless communication using the second type wireless component, a value of the at least one handover parameter based on the received values of the parameters relating to wireless communication using the first type wireless component. It is determined whether the electronic device should be handed over from a first access point to a second access point based on the determined value of the at least one handover parameter.

13 Claims, 2 Drawing Sheets

(51) Int. Cl.
  *H04B 17/318* (2015.01)
  *H04W 84/12* (2009.01)
  *H04W 88/06* (2009.01)

(56) References Cited

U.S. PATENT DOCUMENTS

| | | |
|---|---|---|
| 2007/0191013 A1 | 8/2007 | Gunnarsson |
| 2009/0029703 A1* | 1/2009 | Turnbull ............ H04W 36/0011 455/436 |
| 2009/0154426 A1* | 6/2009 | Perraud ................ H04W 36/26 370/332 |
| 2009/0285167 A1* | 11/2009 | Hirsch .............. H04W 72/1215 370/329 |
| 2010/0317354 A1 | 12/2010 | Kirvar |
| 2011/0003607 A1 | 1/2011 | Forenza et al. |
| 2012/0050331 A1 | 3/2012 | Kanda |
| 2012/0165024 A1* | 6/2012 | Sugahara ............ H04W 36/245 455/440 |
| 2014/0226620 A1 | 8/2014 | Zhou et al. |
| 2014/0369187 A1* | 12/2014 | Sang ....................... H04L 47/14 370/229 |
| 2016/0066225 A1 | 3/2016 | Zhu et al. |
| 2016/0183154 A1 | 6/2016 | Van Der Velde |
| 2016/0255549 A1 | 9/2016 | Lakhdhar |

OTHER PUBLICATIONS

Canadian Intellectual Property Office, Written Opinion for PCT/CA2017/051100 dated Dec. 13, 2017 (4 pages).

* cited by examiner

DETERMINING HANDOVER PARAMETERS

BACKGROUND

An electronic device can include a wireless communication component to allow the electronic device to communicate wirelessly. In some cases, an electronic device can include multiple wireless communication components, such as multiple radio frequency (RF) transceivers. The presence of multiple wireless communication components can result in interference between the wireless communication components, which can lead to reduced reliability in wireless communications.

BRIEF DESCRIPTION OF THE DRAWINGS

Some implementations of the present disclosure are described in connection with the following figures.

DETAILED DESCRIPTION

Figure 1:
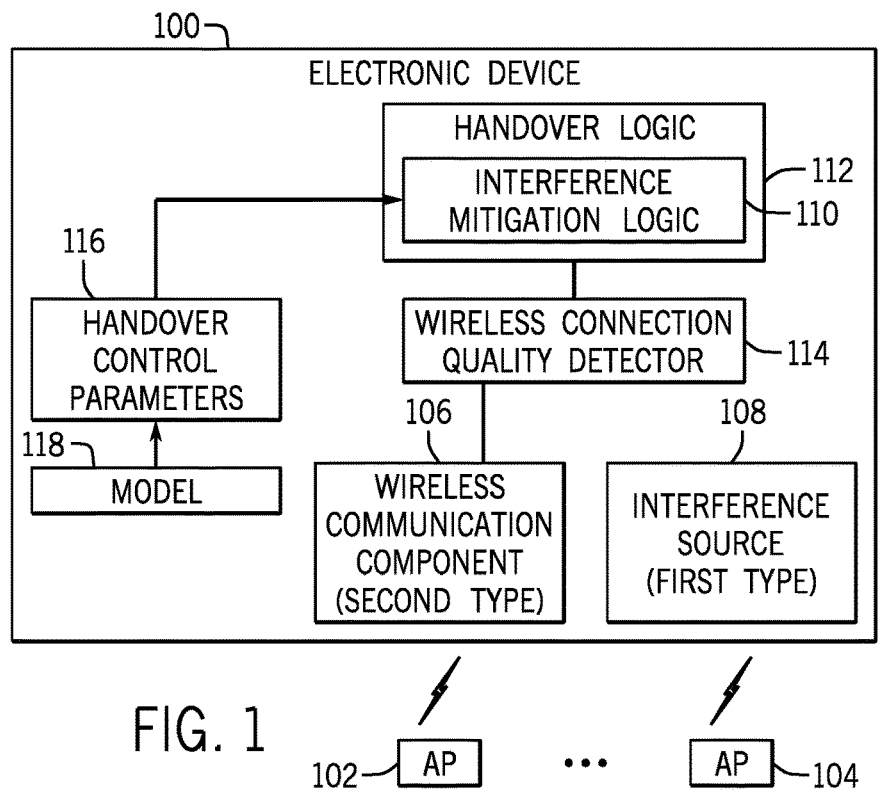
FIG. 1 is a block diagram of an example arrangement that includes an electronic device and access points, where the electronic device has multiple wireless communication components and an interference mitigation logic, according to some implementations.

FIG. 1 is a block diagram of an example arrangement that includes an electronic device 100 and multiple access points (APs) 102, 104. Examples of the electronic device 100 can include a computer (e.g., a desktop computer, a notebook computer, a tablet computer, etc.), a mobile phone, a personal digital assistant, a game appliance, a wearable device (e.g., a smart watch, smart eyeglasses, a head-mounted device, etc.), a sensor device, and so forth.

An AP can refer to a communication device to which a wireless device can establish a wireless connection to communicate with other endpoint devices. An AP can be part of a wireless local area network, which operates according to the Institute of Electrical and Electronic Engineers (IEEE) 802.11 or Wi-Fi Alliance Specifications. In other examples, a WLAN can operate according to other protocols. More generally, techniques or mechanisms according to some implementations of the present disclosure can be used with other types of wireless networks, such as cellular networks or other wireless networks. In a cellular network, an AP can refer to a wireless access network node, such as a base station or enhanced node B (eNodeB) in a cellular network that operates according to the Long-Term Evolution (LTE) standards as provided by the Third Generation Partnership Project (3GPP). The LTE standards are also referred to as the Evolved Universal Terrestrial Radio Access (E-UTRA) standards.

The electronic device 100 includes a wireless communication component 106 that is able to establish wireless connections with any one or more of the APs 102, 104. Although just two APs 102, 104 are depicted in FIG. 1, it is noted that in other examples, more APs 102, 104 can be provided. Establishing a wireless connection with an AP can refer to setting up or otherwise providing resources associated with the AP that are used to carry control and data traffic between the electronic device and the AP.

The electronic device 100 can also include an interference source 108 that can interfere with wireless communications of the wireless communication component 106. The interference source 108 can be another wireless communication component that is able to communicate wirelessly, which can be according to a protocol different from that used by the wireless communication component.

The interference source 108 can be considered a first type wireless communication component, and the wireless communication component 106 can be considered a second type wireless communication component. Wireless communication components are of different types if they use different protocols to perform wireless transmissions and receptions of control and data signaling. More generally, a wireless communication component can refer to any communication interface (in the form of a hardware transmitter and receiver and possibly program code) that is able to communicate wireless signals over a communication medium.

As further examples, although the interference source 108 is shown as being part of the electronic device 100, it is possible that interference with the wireless communication component 106 can be caused by an interference source that is external of the electronic device 100. For example, the interference source can be part of another electronic device that is near the electronic device 100.

As examples, the wireless communication component 106 can include a radio frequency (RF) transceiver to perform RF communications. One type of RF transceiver is a WLAN transceiver that operates according to the IEEE 802.11 protocol.

The interference source 108 can include another RF transceiver, such as an RF transceiver for communicating with a cellular network (e.g., an LTE network), a Bluetooth transceiver, a Global Positioning System (GPS) transceiver, an RF transceiver for performing communication of wireless high-definition audio and video signals, a frequency modulation (FM) radio transceiver, and so forth. Although just one interference source 108 is shown, there can be multiple interference sources either inside the electronic device 100 or outside the electronic device 100, or both.

Interference caused by an internal and/or external interference source can cause desense of the wireless communication component 106. Desense of the wireless communication component 106 can refer to a degradation in sensitivity of the wireless communication component 106 for wireless communications, which can lead to increased error rates or service interruption.

To address desense of the wireless communication component 106 due to presence of an interference source, the electronic device 100 includes interference mitigation logic 110, which is shown as being part of handover logic 112 in the example of FIG. 1. The interference mitigation logic 110 responds to detected interference with the wireless communication component 106 by triggering an action to mitigate the detected interference. The handover logic 112 controls handover of the electronic device 100 between the APs 102 and 104. Handing over the electronic device 100 from a first AP to a second AP refers to causing the electronic device 100 to transition from communicating over a wireless connection with the first AP (source AP) to communicating over a wireless connection with the second AP (destination AP). An action that can be triggered by the interference mitigation logic 110 is handover of the electronic device 100 between APs when interference is detected, to mitigate an effect of the interference. In a WLAN, handover of the electronic device 100 can refer to performing a basic service set (BSS) transition of an electronic device between WLAN APs.

The different APs can be associated with different communication channels, which can be distinguished by different frequencies, or different time slots, or different codes, or some combination of the foregoing. Different APs can refer to different physical APs that are located at geographically separate locations. In other examples, different APs can refer to different logical APs, where two or more of the logical APs can reside at a common physical platform.

The electronic device 100 also includes a wireless connection quality detector 114, which is able to monitor the quality of wireless communications performed by the wireless communication component 106.

Each of the handover logic 112, interference mitigation logic 110, and wireless connection quality detector 114 can be implemented with a hardware processing circuit, or as a combination of machine-readable instructions and a hardware processing circuit. Examples of a hardware processing circuit can include any or some combination of the following: a microprocessor, a core of a multi-core microprocessor, a digital signal processor, a microcontroller, a programmable gate array, a programmable integrated circuit device, or any other type of hardware processing circuit.

The wireless connection quality detector 114 is able to monitor the quality of both uplink and downlink communications between the electronic device 100 and an AP to which the electronic device 100 is currently connected. In some examples, monitoring the quality of a downlink (that carries signals from the source AP to the electronic device 100) can be based on monitoring a received signal strength indicator (RSSI) transmitted by the source AP. RSSI is a measurement of the power present in a received radio signal. In some examples, the higher the RSSI value, the stronger the received radio signal. In other examples, other indicators of the quality of downlink communications can be employed, such as a detected data rate over the downlink, or another indicator.

An example of the quality of an uplink that can be monitored includes an indicator of a transmission retry rate in the uplink. The transmission retry rate refers to a number of retries performed by the wireless communication component 106 on the uplink within a certain time interval. A "retry" can refer to retransmission of data (control data or bearer traffic data) due to corruption of the data or inability of a receiver to successfully receive the data. In other examples, other indicators of the quality of the uplink can be employed, such as a data rate of the uplink.

Information relating to the monitored quality of the wireless connection (uplink or downlink or both) is provided by the wireless connection quality detector 114 to the interference mitigation logic 110. Based on the monitored quality of the wireless connection and handover control parameters 116 (or more simply, "handover parameters"), the interference mitigation logic 110 can decide whether or not to perform a handover of the electronic device 100 from the source AP to a destination AP that is different from the source AP. As noted above, the source AP and the destination AP can include different physical APs, or different logical APs. Handing over the electronic device 100 from the source AP to the destination AP can also refer to causing the electronic device 100 to transition from one communication channel to another communication channel.

In examples where values of the handover control parameters 116 are statically set, the statically set values of the handover control parameters 116 can assume the worst case in terms of interference, i.e., the values of the handover control parameters 116 were determined when an interference source (e.g., 108) caused the most severe interference with the wireless communication component 106. However, making a handover decision based on use of such worst case handover control parameters 116 can result in sub-optimal performance of the electronic device 100, especially under conditions where the interference caused by an interference source is not the worst case interference.

In accordance with some implementations of the present disclosure, the handover control parameters 116 that are provided to the interference mitigation logic 110 are dynamically determined by a processor using a model 118, which can be implemented as a lookup table or a function that produces an output based on an input. The model 118 represents a relationship between parameters relating to wireless communication using a first type wireless communication component (e.g., the interference source 108) and handover control parameters relating to wireless communications using a second type wireless communication component (e.g., the wireless communication component 106). For example, the first type wireless communication component can be a cellular network wireless communication component to communicate over a cellular network, such as an LTE network or other type of cellular network. The second type wireless communication component 106 can be a wireless communication component to communicate over a WLAN that operates according to IEEE 802.11.

Although reference is made to specific examples of specific types of wireless communication components, it is noted that in other examples, other types of wireless communication components can be employed.

In accordance with some implementations of the present disclosure, the model 118 is used to predict values of the handover control parameters 116 (for controlling handover between APs that the electronic device 100 can communicate with using the second wireless communication component 106) based on values of parameters relating to wireless communication using the first type wireless communication component (e.g., the interference source 108). Thus, as the values of the parameters relating to wireless communication using the first type wireless communication component change, the model 118 outputs changed values of the handover control parameters 116. Thus, in some examples, based on the status of wireless communication of the interference source 108 (as represented by the values of the parameters relating to wireless communication using the interference source 108), values of the handover control parameters 116 for controlling handover between WLAN APs can be predicted. Such predicted values are more optimal than worst case values of the handover control parameters 116 that assume worst case interference by the interference source 106.

Examples of parameters relating to wireless communication using the first type wireless communication component (e.g., the interference source 108) can include any or some combination of the following: a frequency of the wireless communication, a frequency bandwidth of the wireless communication, a transmit power used by the first type wireless communication component, amount of resources for the wireless communication, how often the resources are available, and so forth. Although specific parameters are listed, it is noted that in other examples, other or additional parameters can be used.

The parameters relating to wireless communication using the first type wireless communication component may be received from a wireless access network node, such as that of a cellular network.

Figure 2:
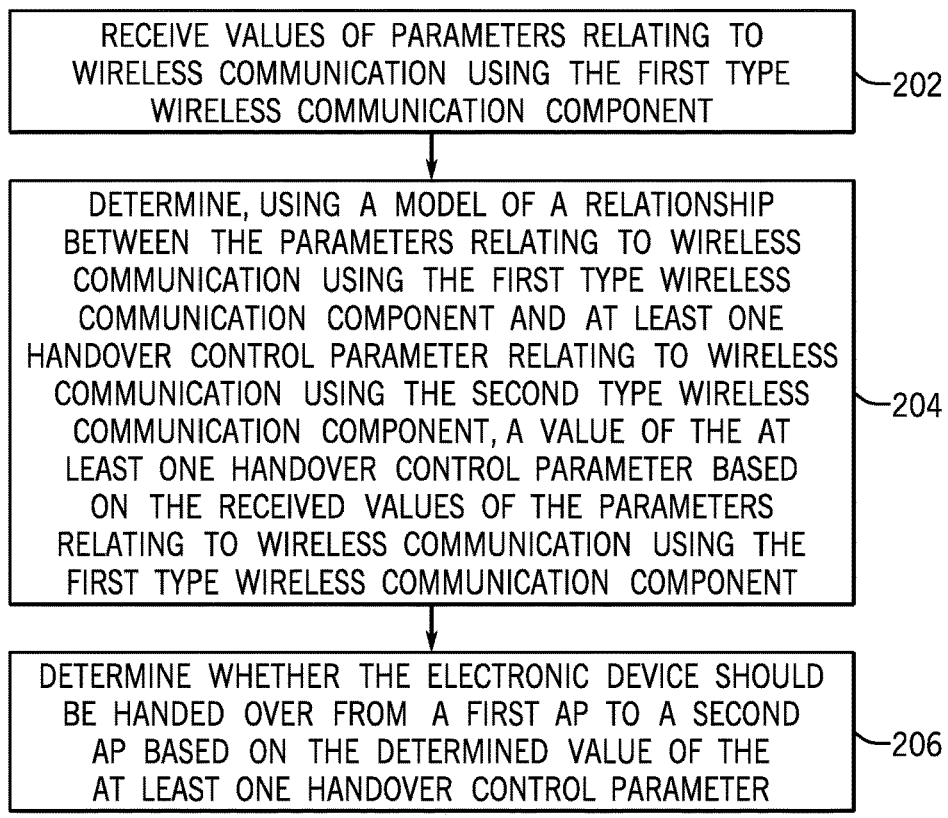
FIG. 2 is a flow diagram of an example interference mitigation process according to some implementations.

FIG. 2 is a flow diagram of a process that can be performed by the electronic device 100, such as by the handover logic 112 and the interference mitigation logic 110. The process of FIG. 2 receives (at 202) values of parameters relating to wireless communications using the first type wireless communication component (e.g., the interference source 108).

The process of FIG. 2 further includes determining (at 204), using a model (e.g., 118) of a relationship between the parameters relating to wireless communication using the first type wireless communication component and at least one handover control parameter (e.g., 116) relating to wireless communication using the second type wireless communication component (e.g., the wireless communication component 106), a value of the at least one handover control parameter based on the received values of the parameters relating to wireless communication using the first type wireless communication component.

The process of FIG. 2 further includes determining (at 206) whether the electronic device 100 should be handed over from a first AP to a second AP based on the determined value of the at least one handover control parameter. The determination of whether the electronic device 100 should be handed over from the first AP to the second AP is based on a relationship between a monitored quality of the wireless connection with the first AP and the determined value of the at least one handover parameter (e.g., the monitored quality of the wireless connection being less than a quality threshold).

In some examples, the handover control parameters 116 can include the following: a wireless connection quality threshold (RoamTrigger) and a difference parameter ($\Delta$). In other examples, other or additional handover control parameters can be used.

When the quality indication provided by the wireless connection quality detector 114 (FIG. 1) indicates that the quality of a specific wireless connection (downlink or uplink or both) has dropped below a specified threshold (RoamTrigger), the interference mitigation logic 110 can make the determination of whether or not to perform handover of the electronic device 100 between APs. As examples, if an RSSI detected by the wireless connection quality detector 114 has dropped below a specified RSSI threshold, or a transmission retry rate detected by the wireless connection quality detector 114 exceeds a transmission retry rate threshold, or a data rate detected by the wireless connection quality detector 114 drops below a data rate threshold, then that is an indication that the wireless connection is exhibiting low quality due to interference experienced by the wireless communication component 106.

In the ensuing discussion, it is assumed that the quality indication provided by the wireless connection quality detector 114 is an RSSI value. Similar techniques can be applied to other types of quality indications.

In some examples, if a detected RSSI drops below a quality threshold (RoamTrigger), which can be expressed in dBm (decibel-milliwatts), then a determination of whether handover is to be performed from the source AP to a given destination AP is based on a further handover control parameter $\Delta$, which represents the difference between the RSSI value of the source AP and a minimum RSSI value that the given candidate destination AP should satisfy:

$$\Delta = sRSSI - mRSSI + b,$$

where sRSSI is the RSSI value of the source AP measured by the wireless connection quality detector 114, mRSSI is the minimum RSSI value that the given candidate destination AP should satisfy, and b is a specified constant (e.g., between 2 to 5 dBm) to prevent a ping-pong effect that can cause the electronic device 100 to handover between APs too frequently. The mRSSI value is used to specify that the destination AP should not have too low an RSSI (and thus too low wireless connection quality), as compared to the detected RSSI of the source AP.

The parameters RoamTrigger (RSSI threshold) and $\Delta$ are examples of the handover control parameters 116 relating to controlling handover between APs that are used in the process of FIG. 2.

In some examples, the roaming condition to trigger a handover from a source AP to a destination AP can be written as follows:

$$(cAP\ is\ available)\ \&\ (sRSSI < RoamTrigger)\ \&\ (cRSSI > sRSSI + \Delta) \quad \text{(Eq. 1)}$$

Eq. 1 specifies that a handover from a source AP to a candidate destination AP ("cAP") is to be triggered if the candidate destination AP is available, and the RSSI of the source AP (sRSSI) is less than RoamTrigger, and the RSSI of the candidate destination AP (cRSSI) exceeds the RSSI of the source AP (sRSSI) by greater than $\Delta$.

In accordance with some implementations, the model 118 (FIG. 1) is used to compute the handover control parameters $\Delta$ and RoamTrigger, which can be written in a vector notation as follows:

$$P_r = \begin{pmatrix} \Delta \\ RoamTrigger \end{pmatrix}. \quad \text{(Eq. 2)}$$

As noted above, the values of the handover control parameters $\Delta$ and RoamTrigger for wireless communication using the second type wireless communication component 106 can be affected by values of parameters relating to wireless communication using the first type wireless communication component (e.g., the interference source 108), which in some examples can be a cellular network wireless communication component. The parameters relating to wireless communication using the cellular network wireless communication component can include the following:

FREQ: frequency band of the cellular network;
FBW: frequency bandwidth, which refers to a width of a carrier;
TxPwr: transmit power;
nRB: number of resource blocks used on the downlink from a wireless access network node, where a resource block refers to a smallest unit of resources, in terms of a number of subcarriers and time slots that can be assigned;
pRB: number of resource blocks used on the uplink to a wireless access network node; and
DC: duty cycle that represents how often the resource blocks are available over a specified time period.

The foregoing parameters can be expressed in a vector notation form, $P_c$, as follows:

$$P_c = \begin{pmatrix} FREQ \\ FBW \\ nRB \\ pRB \\ TxPwr \\ DC \end{pmatrix}. \quad \text{(Eq. 3)}$$

In accordance with some implementations, the model 118 takes as input values of the parameters of $P_c$, and outputs values of the handover control parameters of $P_r$.

The following describes further details according to some implementations for determining the model 118. The model 118 is represented as Win Eq. 10 further below. Although a specific technique is described for determining the model 118, it is noted that in other examples, other techniques for determining the model 118 can be used.

If a set of handover control parameters $P_r'$ is used for dynamic handover decisions between APs (such as APs 102 and 104 in FIG. 1), then a metric, M, for measuring the performance of using this set of parameters, $P_r'$, is expressed by:

$$M(P_r') = \frac{1}{N_r}\sum_r TP(P_r'). \qquad \text{(Eq. 4)}$$

where M is an average of measurements of throughput that can be achieved based on performing handovers using the handover control parameters of by $P_r'$. Throughput can refer to a rate of communication that can be achieved over a wireless communication medium.

In some examples, a technique for determining a function $\mathbb{F}$ is based on computing:

$$\mathbb{F} = \underset{f}{\operatorname{argmax}}(M(f(P_c))), \qquad \text{(Eq. 5)}$$

i.e., the technique looks for a function $\mathbb{F}$ so that using this function $\mathbb{F}$ to determine the handover control parameters leads to an optimal solution in terms of average throughput (expressed by M). Since M is a convex function reaching its maximum around $P_r$, then Eq, 5 simplifies to:

$$\mathbb{F} = \underset{f}{\operatorname{argmax}}(M(f(P_c))) \Leftrightarrow \mathbb{F} = \underset{f}{\operatorname{argmin}}(\|P_r - f(P_c)\|). \qquad \text{(Eq. 6)}$$

Written differently:

$$P_r \approx \mathbb{F}(P_c) \qquad \text{(Eq. 7)}$$
$$= \mathbb{F}(P_c) + \epsilon$$
$$= \hat{P}_r + \epsilon, \ |\epsilon| \ll 1,$$

where $P_r$ are the exact parameters determined experimentally, $\hat{P}_r$ are the estimated values using Eq. 7, and $\in$ is the modeling error.

In some examples, the technique can restrict the function $\mathbb{F}$ to be linear, i.e., if $x = [1, x_1, \ldots, x_n]^T$ is a vector and f is a linear function then:

$$f(x) = \sum_{i=0}^{n} w_i \times x_i = w \times x, \qquad \text{(Eq. 8)}$$

where:

$$w = [w_0, \ldots, w_n]. \qquad \text{(Eq. 9)}$$

Using the same notation as above, one can write:

$$\hat{P}_r = W \times P_c. \qquad \text{(Eq. 10)}$$

In other examples, $f$ can be a non-linear function

In Eq. 10, W represents the model 118, such that once W is derived, values of the parameters in $P_c$ can be used to predict the handover control parameters of $\hat{P}_r$ (note that $\hat{P}_r$ represents values of the handover control parameters that are less optimal than values of the handover control parameters of $P_r$ that are considered to be optimal).

The $\|\|_2$ norm can be used for deriving the expression of the function W, i.e., the technique is looking for the function W that minimizes the sum of the squared errors, $\xi$.

$$\xi(W) = \|P_r - W \times P_c\|_2 \qquad \text{(Eq. 11)}$$
$$= E((P_r - W \times P_c)^2),$$

where the E operator denotes expectancy.

Eq. 11 can be written as:

$$\xi(W) = E(P_r \times P_r^t + W \times P_c \times P_c^t \times W^t - 2P_r \times W \times P_c) \qquad \text{(Eq. 12)}$$
$$= E(P_r \times P_r^t) + E(W \times P_c \times P_c^t \times W^t) - 2E(P_r \times P_c^t \times W^t).$$

Minimizing the error defined in Eq. 12, implies that $\partial \xi(W)/\partial W = 0$.

$$\frac{\partial \xi(W)}{\partial W} = 2W \times E(P_c \times P_c^t) - 2E(P_r \times P_c^t) = 0 \qquad \text{(Eq. 13)}$$

$$W \overset{\leftrightarrow}{=} E(P_r \times P_c^t) \times E(P_c \times P_c^t)^{-1}. \qquad \text{(Eq. 14)}$$

W is the cross-correlation matrix between $P_r$ and $P_c$ divided by the correlation matrix of $P_c$. In this case, $\hat{P}_r$ is defined as:

$$\hat{P}_r = E(P_r \times P_c^t) \times E(P_c \times P_c^t)^{-1} \times P_c. \qquad \text{(Eq. 15)}$$

Thus, in some implementations, finding the values of W is tightly related to estimating $E(P_r \times P_c^t)$ and $E(P_c \times P_c^t)$.

Experimental measurements can be made in such a way that a set of data expressed as a pair of values can be derived as follows:

$$(P_r, P_c)_i = (P_r^i + \in_r, P_r^i + \in_c), \qquad \text{(Eq. 16)}$$

where $\in_r$ and $\in_c$ are $P_r$ measurement errors and $P_c$ measurement errors, respectively. The experimental measurements are measurements of RSSI made with different settings of the handover control parameters of $P_r$ and parameters of $P_c$. For simplification reasons, it can be assumed that $\in_r$ and $\in_c$ are independent, i.e., $E(\in_r, \in_c) = 0$. In this case:

$$E(P_r \times P_c^t)_{ij} = E\left(\sum_{k=1}^{N}[P_{r,k}^j + \epsilon_r] \times [P_{c,j}^k + \epsilon_c]\right) \qquad \text{(Eq. 17)}$$
$$= E\left(\sum_{k=1}^{N} P_{r,k}^j \times P_{c,i}^k\right),$$

$$E(P_c \times P_c^t)_{ij} = E\left(\sum_{k=1}^{N}[P_{r,k}^j + \epsilon_c] \times [P_{c,j}^k + \epsilon_c]\right) \qquad \text{(Eq. 18)}$$
$$= E\left(\sum_{k=1}^{N} P_{ck}^i \times P_{cj}^k\right) + \partial_{ij} \times E(\epsilon_c^2),$$

where $\partial_{ij} = 1$ if $i = j$ and 0 elsewhere. The error of the measurements of $P_c$ are only present on the diagonal of the matrix $E(P_c \times P_c^t)$. N in the above equations is the number of measurements.

Once Eqs. 17 and 18 are used to derive $E(P_r \times P_c^r)$ and $E(P_c \times P_c^r)$, then the model 118, represented by the function W, can be derived according to Eq. 14 above.

Figure 3:
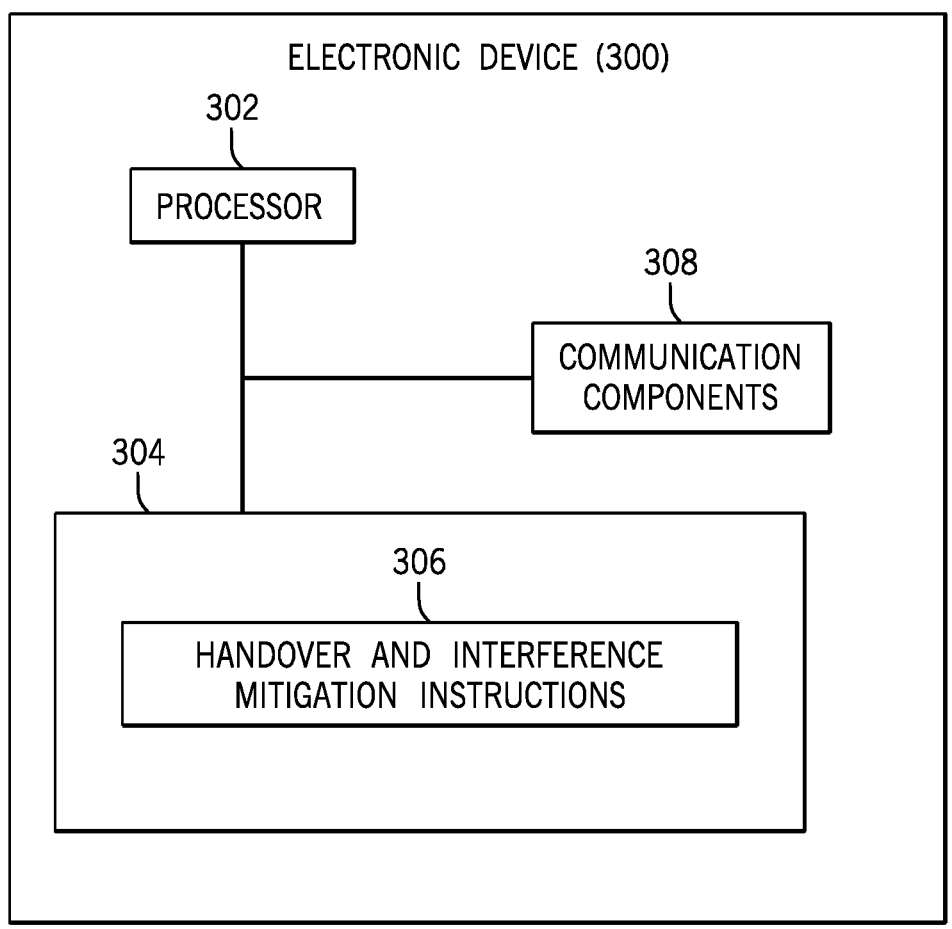
FIG. 3 is a block diagram of an example electronic device, according to further implementations.

FIG. 3 shows an electronic device 300 that includes a processor 302 (or multiple processors) and a non-transitory machine-readable or computer-readable storage medium 304. A processor can include a microprocessor, a core of a multi-core microprocessor, a microcontroller, a programmable integrated circuit, a programmable gate array, or another hardware processing circuit.

The storage medium 304 can store machine-readable instructions, such as handover and interference mitigation instructions 306 as well as other machine-readable instructions. The handover and interference mitigation instructions 306 can perform tasks of the handover logic 112 and the interference mitigation logic 112 discussed above.

The electronic device 300 further includes communication components 308, such as those described above.

The storage medium 304 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of mitigating interference of wireless communications, comprising:
   receiving, by an electronic device that includes a first type wireless component and a second type wireless component, values of first parameters relating to wireless communication using the first type wireless component;
   inputting, by the electronic device, the values of the first parameters relating to wireless communication using the first type wireless component into a model of a relationship between the first parameters relating to wireless communication using the first type wireless component and at least one handover parameter relating to wireless communication using the second type wireless component, wherein the at least one handover parameter comprises a wireless connection quality threshold usable for deciding whether a monitored quality of a wireless connection should trigger a handover, and wherein the model is based on a cross correlation between a first set including the first parameters relating to wireless communication using the first type wireless component and a second set including the at least one handover parameter relating to wireless communication using the second type wireless component;
   outputting, by the model in response to the inputting of the values of the first parameters into the model, a value of the at least one handover parameter; and
   determining whether the electronic device should be handed over from a first access point to a second access point based on the value of the at least one handover parameter, the electronic device to communicate with the first access point and the second access point using the second type wireless component, wherein determining that the electronic device should be handed over from the first access point to the second access point is responsive to the monitored quality of wireless connection established using the second type wireless component being less than the wireless connection quality threshold.

2. The method of claim 1, wherein the at least one handover parameter comprises a difference parameter representing a difference in wireless connection qualities of respective wireless connections established by the electronic device with a source access point and a candidate destination access point using the second type wireless component.

3. The method of claim 2, wherein determining that the electronic device should be handed over from the first access point to the second access point is responsive to the monitored quality of wireless connection with the second access point established using the second type wireless component exceeding by greater than a value of the difference parameter a monitored quality of a wireless connection with the first access point established using the second type wireless component.

4. The method of claim 1, wherein the monitored quality of wireless connection comprises a wireless connection quality indicator selected from among a received signal strength indicator (RSSI), a number of retries, and a data rate.

5. The method of claim 1, further comprising performing, based on the determining, a handover from the first access point to the second access point to mitigate interference to a wireless communication using the second type wireless component caused by an interference source comprising the first type wireless component.

6. The method of claim 1, wherein the model is derived based on experimental measurements.

7. An electronic device comprising:
   a first type wireless component for wireless communication according to a first wireless protocol;
   a second type wireless component for wireless communication according to a second wireless protocol different from the first wireless protocol, wherein the second type wireless component comprises a wireless local area network (WLAN) wireless component to communicate with a WLAN; and
   at least one processor configured to:
     receive values of first parameters relating to wireless communication using the first type wireless component;
     input the values of the first parameters relating to wireless communication using the first type wireless component into a model representing a relationship between the first parameters relating to wireless communication using the first type wireless component and at least one handover parameter relating to wireless communication using the WLAN wireless component;

output, by the model in response to the inputting of the values of the first parameters into the model, a value of the at least one handover parameter, wherein the at least one handover parameter comprises a wireless connection quality threshold usable for deciding whether a monitored quality of a wireless connection should trigger a handover, and a difference parameter representing a difference in wireless connection qualities of respective wireless connections established by the electronic device with a source access point and a candidate destination access point, determine, based on values of the wireless connection quality threshold and the difference parameter output by the model, that the electronic device should be handed over from a first WLAN access point to a second WLAN access point responsive to:

a monitored quality of a wireless connection with the first WLAN access point established using the WLAN wireless component being less than the value of the wireless connection quality threshold, and a quality of wireless connection with the second WLAN access point established using the WLAN wireless component exceeding by greater than the value of the difference parameter the monitored quality of wireless connection with the first access point.

8. The electronic device of claim 7, wherein the first parameters relating to wireless communication using the first type wireless component are selected from among a frequency band, a frequency bandwidth, an amount of resources, a transmit power, and a duty cycle of availability of resources.

9. The electronic device of claim 7, wherein the first type wireless component comprises a cellular network wireless component to communicate with a cellular network.

10. The electronic device of claim 7, wherein the first parameters relating to wireless communication using the first type wireless component are received from a wireless access network node.

11. A non-transitory machine-readable storage medium storing instructions that upon execution cause an electronic device comprising a first type wireless component that operates according to a first wireless protocol and a second type wireless component that operates according to a different second wireless protocol to:

monitor a quality of a wireless connection established using the second type wireless component, wherein the quality of the wireless connection is selected from among a received signal strength indicator (RSSI), a number of retries, and a data rate;

input received values of a first set of parameters relating to wireless communication using the first type wireless component into a model of a relationship between the first set of parameters relating to wireless communication using the first type wireless component and a second set of handover parameters relating to wireless communication using the second type wireless component, wherein the model is based on a cross correlation between the first set of parameters relating to wireless communication using the first type wireless component and the second set of handover parameter relating to wireless communication using the second type wireless component;

output, by the model in response to the inputting of the received values of the first set of parameters into the model, values of the handover parameters; and determine whether the electronic device should be handed over from a first access point to a second access point based on a relationship between the monitored quality of wireless connection and the values of the handover parameters output by the model, the electronic device to communicate with the first access point and the second access point using the second type wireless component.

12. The non-transitory machine-readable storage medium of claim 11, wherein the instructions upon execution cause handover from the first access point to the second access point to mitigate interference to wireless communication using the second type wireless component caused by one or more of a plurality of types of interference sources.

13. The non-transitory machine-readable storage medium of claim 12, wherein the first set of parameters relates to wireless communication with a cellular network, and the second set of handover parameters relates to wireless communication with a wireless local area network.

* * * * *